United States Patent [19]

Stephens

[11] Patent Number: 4,501,880

[45] Date of Patent: Feb. 26, 1985

[54] COPOLYOXADIAZOLE-IMIDE CONTAINING 5-TERTIARY BUTYL PHENYLENE MOIETY

[75] Inventor: James R. Stephens, Naperville, Ill.

[73] Assignee: Standard Oil Company (Indiana), Chicago, Ill.

[21] Appl. No.: 567,083

[22] Filed: Dec. 30, 1983

Related U.S. Application Data

[63] Continuation-in-part of Ser. No. 424,607, Sep. 27, 1982, abandoned.

[51] Int. Cl.³ ............................................. C08G 73/08
[52] U.S. Cl. ................................. 528/322; 428/411.1; 428/473.5; 528/179; 528/183; 528/313; 528/321; 528/350; 528/353
[58] Field of Search .............. 528/322, 179, 183, 313, 528/321, 350, 353

[56] References Cited

U.S. PATENT DOCUMENTS 4,429,108  1/1984  Stephens ............................ 528/322

Primary Examiner—Harold D. Anderson
Attorney, Agent, or Firm—Gunar J. Blumberg; William T. McClain; William H. Magidson

[57] ABSTRACT

Novel copolyoxadiazole-imides are disclosed. These copolyoxadiazole-imides are useful for the manufacture of fibers, films, felts, coatings and molded objects.

52 Claims, No Drawings 4,501,880

COPOLYOXADIAZOLE-IMIDE CONTAINING 5-TERTIARY BUTYL PHENYLENE MOIETY

BACKGROUND OF THE INVENTION

This is a continuation-in-part application of Ser. No. 424,607 filed Sept. 27, 1982, now abandoned.

FIELD OF THE INVENTION

The field of this invention relates to novel copolyoxadiazoles (Co-POD's) most of which are soluble in organic solvents such as m-cresol and useful as coatings, molded objects, films and fibers.

In the prior art, the article by Y. Iwakura, et al., in *The Journal of Polymer Science* (A) 3 page 45 (1965) a method for the synthesis of polyoxadiazoles from hydrazine sulfate and simple diacids such as terephthalic acid is disclosed. Other prior art reference include the article by R. S. Jones, et al., in *The Journal of Applied Polymer Science*, Vol. 25, pages 315–321 (1980), British Patent Specification No. 1,455,776; Canadian Pat. No. 882,785 and the article by S. K. Varma, et, al., in *The Journal of Applied Polymer Science*, Volume 26, pages 571–577 (1981) and U.S. Pat. No. 3,238,183.

The following Japanese patents further illustrate the prior art: J79,029,509-B42; J79,034,732-B47; J80,027,918-C34 and J50,037,778-W28.

None of the foregoing references contemplate copolyoxadiazoles soluble in m-cresol and useful as coatings, molded objects and films. In the book *Thermally Stable Polymers* by P. E. Cassidy, Marcel Dekker, Inc., New York, 1980, p. 188, the author states that "fully aromatic polyoxadiazoles are soluble only in strong acids such as concentrated sulfuric or trifluoroacetic acid."

An object of this invention is to provide copolyoxadiazoles from 5-t-butylisophthalic acid (5-tBIA), and N,N-alkylene and N,N' arylene-bis(4-carboxyphthalimides), particularly N,N'-1,2-ethylenebis(4-carboxyphthalimide) (NEBC) when co-reacted with either terephthalic acid or isophthalic acid or a mixture of terephthalic acid and isophthalic acid. A further objective is to provide molded objects, coatings, films and fibers from the aforementioned copolyoxadiazoles.

I have found that the novel Co-POD's can be prepared by reacting 5-t-butylisophthalic acid with terephthalic acid or isophthalic acid or a mixture of both, and N,N'-1,2-ethylenebis(4-carboxyphthalimide) (NEBC) with hydrazine sulfate, utilizing fuming sulfuric acid as the participating reaction medium.

The reaction is conducted at a temperature of about 25 to about 250° C. The Co-POD's have an inherent viscosity measured in sulfuric acid at 25° C. at about 0.6 to 6.0 or higher.

The novel Co-POD's comprise moieties of the following repeating structures:

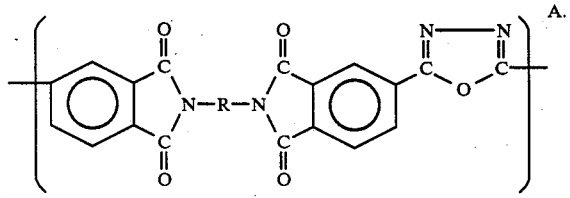
A.

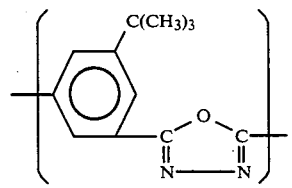
B.

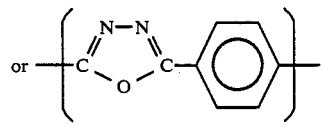
C.

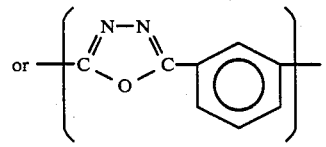
D.

Suitable Co-POD's comprise ABCD units, ABC units ABD units, ACD units, AC units, AD units, AB units. The mole ratio of A to B units of B, C, and D units or C units or D units or to any combination can vary from about 1:99 to about 99:1.

In Unit A, R can be an aliphatic or aromatic moiety. Suitably, when R is an aliphatic hydrocarbon the carbon chain comprises from about 1 to about 12 carbon atoms. The preferred values for R are —(CH$_2$)$_2$—, —(CH$_2$)$_6$—,

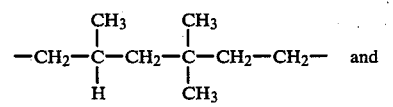
and

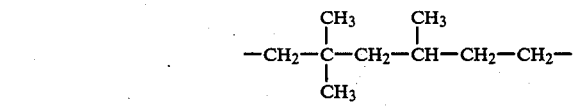

or mixture of the last two radicals in a ratio of about 1:99 to about 99:1 preferably in a ratio of 1:1. When R is an aromatic hydrocarbon radical the carbon atoms are in the range of about 6 to about 20 or R may be selected from the following

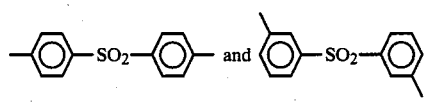

Most of the novel Co-POD's are soluble in m-cresol and are useful in fiber, film, coating and molding applications. They can also be utilized as felts.

Our copolyoxadiazole-imide always has the following two repeating structural units:

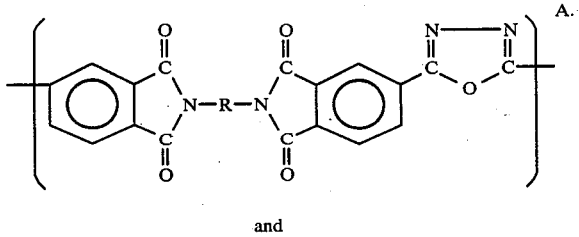

and

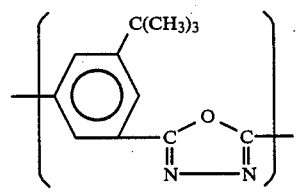

wherein the mole ratio of A to B is about 1:99 to about 99:1 and wherein R is an aliphatic or aromatic radical. However, in addition to containing the A and B moieties the novel copolyoxadiazoles can also contain C moieties of the following structure:

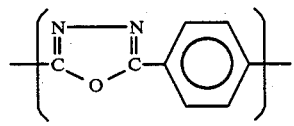

wherein the mole ratio of A and B and C is about 1:99 to about 99:1 and the mole ratio of B to C is about 1:99 to about 99:1.

Alternatively our copolyoxadiazoles can contain, in addition to A and B moieties, D moieties of the following structure:

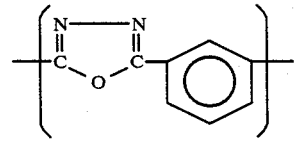

wherein the mole ratio of A to B and D is about 1:99 to about 99:1 and the mole ratio of B to D is about 1:99 to about 99:1.

Furthermore, our copolyoxadiazole-imides may comprise A, B, C and D units wherein the mole ratio of A to B, C and D is about 1:99 to about 99:1 and the mole ratio of B:C is about 1:99 to about 99:1, the mole ratio of B:D is about 1:99 to about 99:1 and the mole ratio of C:D is about 1:99 to about 99:1.

The novel Co-POD's have excellent thermal properties and can be molded into useful articles, cast into films and coatings, or spun into fibers.

Fibers can be manufactured from the homo- and copolymers in the following manner: The reaction solution, after completion of the polycondensation of the hydrazine sulfate with the appropriate diacid is cooled and mixed with sulfuric acid until a solution with the required viscosity is formed. The mixture is homogenized with stirring, and the resulting solution is filtered through an acid-proof fabric and deaerated under vacuum. The resulting spinning solution is formed into fibers using a 0 to 55 percent aqueous solution of sulfuric acid as spinning batch. Non-washed, freshly formed fibers are oriented by stretching, for example, in air, or in a bath of 0 to about 70 percent aqueous sulfuric acid, then washed with water to remove the sulfuric acid and dried. A useful fiber spinning method is disclosed by R. S. Jones, et al., *The Journal of Applied Polymer Science*, Vol. 25, 315–321 (1980).

The polymerization reactions can be carried out in fuming sulfuric acid or polyphosphoric acid. The use of polyphosphoric acid is useful for the general preparation of the novel copolyoxadiazole-imides. However, it is advantageous to prepare our copolyoxadiazoles in fuming sulfuric acid. When using fuming sulfuric acid the R group in our A copolyoxadiazole moiety, preferably comprises electron withdrawing groups. Suitable electron withdrawing groups are $-SO_2-$, $-NO_2-$ and etc. The following examples illustrate the preferred embodiment of the invention. It will be understood that the examples are for illustrative purposes only and do not purport to be wholly definitive with respect to conditions or scope of the invention.

EXAMPLE 1

General Procedure

A small resin flask fitted with a sealed stirrer, pressure equalized dropping funnel, a flowing nitrogen blanket to keep out air and carry off vent gases, was charged with 0.0245 mole of aromatic diacid as mixtures and 3.99 grams or 0.0307 mole hydrazine sulfate. Forty grams of fuming sulfuric acid (30 percent $SO_3$) were added all at once to the dry reactant mixture. Stirring was commenced simultaneously, with the flask being lowered into a hot oil bath controlled at 150° C. Stirring was continued for 30 minutes. During this time complete solution of reactants usually took place within 10 minutes. Some foaming also took place, and usually within 20 minutes a large and abrupt rise in viscosity took place. At the end of the stirring-heating period the viscous reaction solutions were either poured or added in chunks to 500 ml. of cold distilled water in a home blender and agitated for ca. 10 seconds or until particles or fibrids in the millimeter range were obtained. The precipitated polymers were then washed slowly with several portions of distilled water until the effluent water had a pH of ca. 5. After a brief period of air drying on the filter, the polymers were dried either 16 hours at 130° C. under vacuum or at this temperature to constant weight.

Using the above procedure, a number of copolymers (and comparison homopolymers) were made. Their characterization is shown in Table 1 and Table 2.

Film Preparation

Co-POD's were dissolved in m-cresol at 15 percent solids content, spread on glass or steel plates at ca. 5 mil wet thickness, then baked at 316° C. in a circulating air oven for 10 minutes. The resultant films were inspected—all tested were tough and integral.

TABLE 1

Copolyoxadiazole-imides, Solubility in m-Cresol and Tg as a Function of Aromatic Diacid Composition

| Aromatic Diacid Composition in Molar % | | | | [η] 0.5 H₂SO₄ | Solubility in m-Cresol at 2% Solids | Tg |
|---|---|---|---|---|---|---|
| (A) NEBC | (B) 5-t-BIA | (C) TA | (D) IA | | | |
| 100 | — | — | — | 1.5 | no | n.t. |
| 50 | 50 | — | — | 1.5 | yes | 291° C. |
| 60 | — | — | 40 | 1.7 | yes | 292 |
| 50 | — | — | 50 | 1.4 | yes | 290 |
| 40 | — | 20 | 40 | 1.0 | yes | 302 |
| 25 | — | 25 | 50 | 1.4 | yes | 308 |
| 40 | — | — | 60 | 1.7 | yes | 292 |
| 30 | 40 | 10 | 20 | 1.4 | yes | 298 |
| 25 | — | 75 | — | n.t. | no | n.t. |
| 25 | — | 15 | 60 | 0.8 | yes | 300 |
| 25 | — | 25 | 50 | 1.4 | yes | 308 | n.t. = not tested

TABLE 2

COPOLYOXADIAZOLE FILMS - COMPOSITION, CHARACTERIZATION AND APPEARANCE

| Laboratory Run Code | Aromatic Diacid Composition in Molar % | | | | Tg | Inherent Viscosity at 0.5 g/dl. in H₂SO₄ | Viscosity in Stokes of 15% Solutions in m-cresol | Appearance after Evaporative Bake at 316° C. for 10 minutes |
|---|---|---|---|---|---|---|---|---|
| | TA | IA | 5-tBIA | NEBC | | | | |
| 6353-94 | — | — | 50 | 50 | 291° C. | 1.3 | 20 | Clear and Toughest |
| 95 | — | 33⅓ | 33⅓ | 33⅓ | 288 | 1.3 | 15 | Mainly Clear |
| 96 | 25 | 25 | 25 | 25 | 306 | 1.5 | 41 | Mainly Clear |
| 97 | 10 | 20 | 40 | 30 | 298 | 1.4 | 17 | Almost Clear |
| 98 | 10 | 20 | 30 | 40 | 295 | nt | nt | Almost Clear |

Tg obtained by DSC
nt = not tested

I claim:

1. A moldable copolyoxadiazole-imide comprising the following repeating structural units:

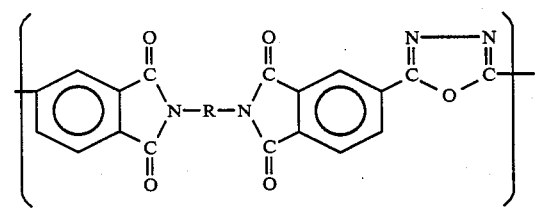

and

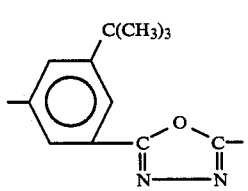

wherein the mole ratio of A to B is about 1:99 to about 99:1 and wherein R is an aliphatic or aromatic radical.

2. The copolyoxadiazole-imide of claim 1 wherein R is a divalent aliphatic radical having from about 1 to about 20 carbon atoms.

3. The copolyoxadiazole-imide of claim 2 wherein R is selected from the following:

—(CH₂)₂—, —(CH₂)₆—,

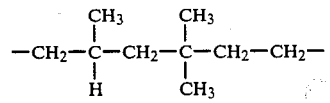

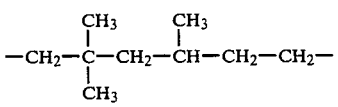

or a mixture of I and II, wherein the molar ratio of I to II is about 1:99 to about 99:1.

4. The copolyoxadiazole-imide of claim 3 wherein the ratio of I to II is about 1:1.

5. The copolyoxadiazole-imide of claim 1 wherein R is a divalent aromatic radical having from about 6 to about 20 carbon atoms.

6. The copolyoxadiazole-imide of claim 1 wherein R is selected from the following

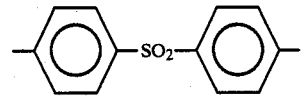

or

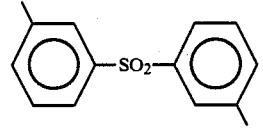

7. The copolyoxadizole-imide of claim 5 wherein R includes electron withdrawing moieties which prevent the sulfonation of the aromatic ring in oleum reaction medium.

8. The copolyoxadiazole-imide of claim 7 wherein the electron withdrawing groups are selected from —SO₂— or —NO₂—.

9. The copolyoxadiazole-imide of claim 1 in the form of a felt.

10. The copolyoxadiazole-imide of claim 1 in the form of a fiber.

11. The copolyoxadiazole-imide of claim 1 in the form of a film.

12. The copolyoxadiazole-imide of claim 1 in the form of a laminate.

13. The copolyoxadiazole-imide of claim 1 in the form of a molded object.

14. A moldable copolyoxadiazole-imide comprising the following repeating structural units:

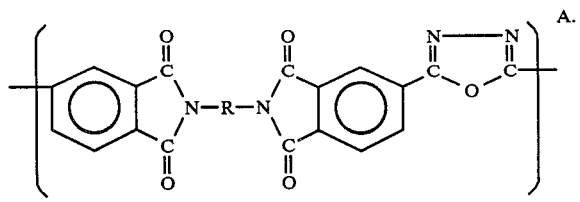

and

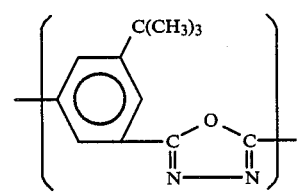

and

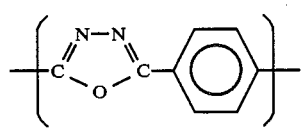

wherein the mole ratio of A to B and C is about 1:99 to about 99:1 and the mole ratio of B to C is about 1:99 to about 99:1 and wherein R is an aliphatic or aromatic radical.

15. The copolyoxadiazole-imide of claim 14 wherein R is a divalent aliphatic radical having from about 1 to about 20 carbon atoms.

16. The copolyoxadiazole-imide of claim 15 wherein R is selected from the following:

—(CH$_2$)$_2$—, —(CH$_2$)$_6$—, $$-CH_2-\underset{\underset{H}{|}}{\overset{\overset{CH_3}{|}}{C}}-CH_2-\underset{\underset{CH_3}{|}}{\overset{\overset{CH_3}{|}}{C}}-CH_2-CH_2-\quad \text{I.}$$

$$-CH_2-\underset{\underset{CH_3}{|}}{\overset{\overset{CH_3}{|}}{C}}-CH_2-\overset{\overset{CH_3}{|}}{CH}-CH_2-CH_2-\quad \text{II.}$$

or a mixture of I and II, wherein the molar ratio of I to II is about 1:99 to about 99:1.

17. The copolyoxadiazole-imide of claim 16 wherein the ratio of I to II is about 1:1.

18. The copolyoxadiazole-imide of claim 14 wherein R is a divalent aromatic radical having from about 6 to about 20 carbon atoms.

19. The copolyoxadiazole-imide of claim 14 wherein R is selected from the following

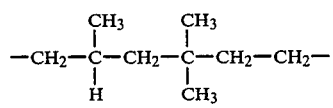

or

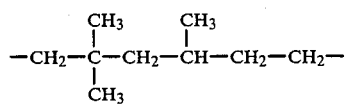

20. The copolyoxadiazole-imide of claim 18 wherein R includes electron withdrawing drawing moieties which prevent the sulfonation of the aromatic ring in oleum reaction medium.

21. The copolyoxadiazole-imide of claim 20 wherein the electron withdrawing groups are selected from —SO$_2$— or —NO$_2$—.

22. The copolyoxadiazole-imide of claim 14 in the form of a felt.

23. The copolyoxadiazole-imide of claim 14 in the form of a fiber.

24. The copolyoxadiazole-imide of claim 14 in the form of a film.

25. The copolyoxadiazole-imide of claim 14 in the form of a laminate.

26. The copolyoxadiazole-imide of claim 14 in the form of a molded object.

27. A moldable copolyoxadizole-imide comprising the following repeating structural units:

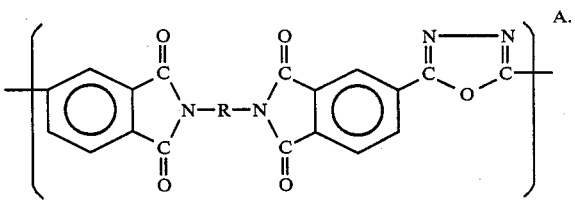

and

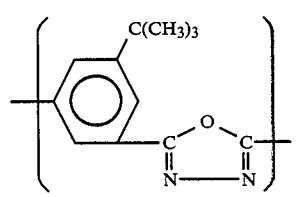

and

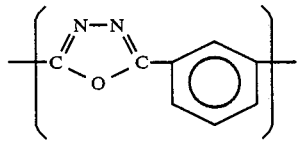

wherein the mole ratio of A to B and D is about 1:99 to about 99:1 and the mole ratio of B to D is about 1:99 to about 99:1 and wherein R is an aliphatic or aromatic radical.

28. The copolyoxadiazole-imide of claim 27 wherein R is a divalent aliphatic radical having from about 1 to about 20 carbon atoms.

29. The copolyoxadiazole-imide of claim 27 wherein R is selected from the following:

—(CH$_2$)$_2$—, —(CH$_2$)$_6$—,

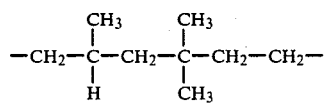  I.

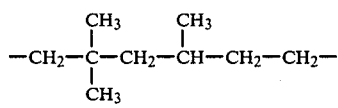  II.

or a mixture of I and II, wherein the molar ratio of I to II is about 1:99 to about 99:1.

30. The copolyoxadiazole-imide of claim 29 wherein the ratio of I to II is about 1:1.

31. The copolyoxadiazole-imide of claim 27 wherein R is a divalent aromatic radical having from about 6 to about 20 carbon atoms.

32. The copolyoxadiazole-imide of claim 27 wherein R is selected from the following

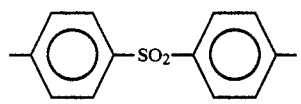

or

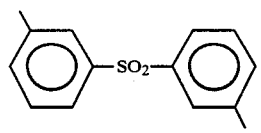

33. The copolyoxadiazole-imide of claim 31 wherein R includes electron withdrawing moieties which prevent the sulfonation of the aromatic ring in oleum reaction medium.

34. The copolyoxadiazole-imide of claim 33 wherein the electron withdrawing groups are selected from —SO₂— or —NO₂—.

35. The copolyoxadiazole-imide of claim 27 in the form of a felt.

36. The copolyoxadiazole-imide of claim 27 in the form of a fiber.

37. The copolyoxadiazole-imide of claim 27 in the form of a film.

38. The copolyoxadiazole-imide of claim 27 in the form of a laminate.

39. The copolyoxadiazole-imide of claim 27 in the form of a molded object.

40. A moldable copolyoxadiazole-imide comprising the following repeating structural units:

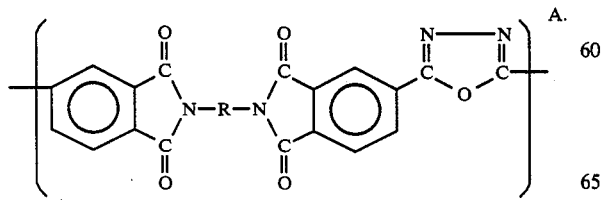  A.

and

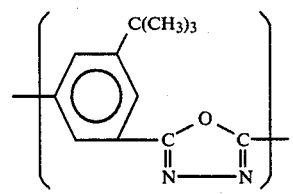  B.

and

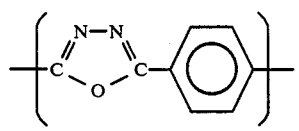  C.

and

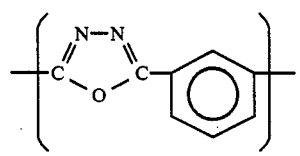  D.

wherein the mole ratio of A to B, C and D is about 1:99 to about 99:1 and the mole ratio of B:C is about 1:99 to about 99:1, the mole ratio of B:D is about 1:99 to about 99:1 and the mole ratio of C:D is about 1:99 to about 99:1 and wherein R is an aliphatic or aromatic radical.

41. The copolyoxadiazole-imide of claim 40 wherein R is a divalent aliphatic radical having from about 1 to about 20 carbon atoms.

42. The copolyoxadiazole-imide of claim 40 wherein R is selected from the following:

—(CH₂)₂—, —(CH₂)₆—,

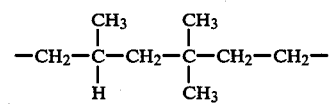  I.

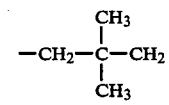  II.

or a mixture of I and II, wherein the molar ratio of I to II is about 1:99 to about 99:1.

43. The copolyoxadiazole-imide of claim 42 wherein the ratio of I to II is about 1:1.

44. The copolyoxadiazole-imide of claim 40 wherein R is a divalent aromatic radical having from about 6 to about 20 carbon atoms.

45. The copolyoxadiazole-imide of claim 40 wherein R is selected from the following

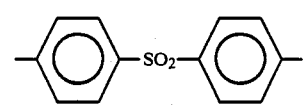

or

-continued

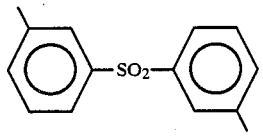

46. The copolyoxadiazole-imide of claim 44 wherein R includes electron withdrawing moieties which prevent the sulfonation of the aromatic ring in oleum reaction medium.

47. The copolyoxadiazole-imide of claim 46 wherein the electron withdrawing groups are selected from —SO$_2$— or —NO$_2$—.

48. The copolyoxadiazole-imide of claim 46 in the form of a felt.

49. The copolyoxadiazole-imide of claim 46 in the form of a fiber.

50. The copolyoxadiazole-imide of claim 46 in the form of a film.

51. The copolyoxadiazole-imide of claim 46 in the form of a laminate.

52. The copolyoxadiazole-imide of claim 46 in the form of a molded object.

* * * * *

UNITED STATES PATENT OFFICE
CERTIFICATE OF CORRECTION

Patent No. 4,501,880                                    Dated February 26, 1985

Inventor(s)  JAMES R. STEPHENS

It is certified that error appears in the above-identified patent and that said Letters Patent are hereby corrected as shown below:

| Patent Column | Line | |
|---|---|---|
| 1 | 23 | After "et" delete -- , -- |
| 1 | 39 | "N,N-alkylene" should be -- N,N'-alkylene -- |
| 1 | 39 | "N,N'arylene-bis should be -- N,N'-arylenebis -- |
| 1 | 67 | After " 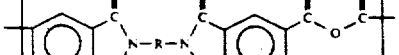 " Add -- and -- |
| 2 | 26 | After "units"(second occurrence) Add -- , -- |
| 3 | 33 | "and" (first occurrence) should be --- to --- |
| 3 | 55 | "99:1" (boldface) should be -- 99:1 -- (regular type) |
| 5 | 22 | (After "FILMS" "-" should be -- -- -- |
| 5 | 64 | Before "is" delete -- $-(CH_2)_2-$, $-(CH_2)_6-$, -- |

Signed and Sealed this

Fifteenth   Day of   October 1985

[SEAL]

Attest:

DONALD J. QUIGG

Attesting Officer

Commissioner of Patents and
Trademarks—Designate